US008181510B2

(12) United States Patent
Aldred et al.

(10) Patent No.: US 8,181,510 B2
(45) Date of Patent: May 22, 2012

(54) SYSTEM AND METHOD FOR CORRECTING ERRORS IN DEPTH FOR MEASUREMENTS MADE WHILE DRILLING

(75) Inventors: Walter Aldred, Thriplow (GB); Maurice Ringer, Bracken Ridge (AU)

(73) Assignee: Schlumberger Technology Corporation, Sugar Land, TX (US)

( * ) Notice: Subject to any disclaimer, the term of this patent is extended or adjusted under 35 U.S.C. 154(b) by 842 days.

(21) Appl. No.: 10/573,236

(22) PCT Filed: Sep. 28, 2004

(86) PCT No.: PCT/GB2004/004123
§ 371 (c)(1),
(2), (4) Date: Aug. 18, 2008

(87) PCT Pub. No.: WO2005/033473
PCT Pub. Date: Apr. 14, 2005

(65) Prior Publication Data
US 2009/0038392 A1    Feb. 12, 2009

(30) Foreign Application Priority Data
Oct. 1, 2003    (GB) .................................. 0322966.3

(51) Int. Cl.
*E21B 44/00*    (2006.01)
(52) U.S. Cl. .................................... 73/152.43
(58) Field of Classification Search .................. None
See application file for complete search history.

(56) References Cited

U.S. PATENT DOCUMENTS

| | | | |
|---|---|---|---|
| 4,556,884 A | 12/1985 | Howells et al. | |
| 4,756,188 A | 7/1988 | Fennell | |
| 4,852,052 A | 7/1989 | Frey et al. | |
| 5,062,048 A | 10/1991 | Coulter et al. | |
| 2003/0000300 A1 | 1/2003 | Wong | |
| 2004/0124012 A1 | 7/2004 | Dunlop et al. | |
| 2005/0128871 A1 | 6/2005 | Garcia-Osuna et al. | |
| 2009/0164125 A1 | 6/2009 | Bordakov et al. | |

FOREIGN PATENT DOCUMENTS

| | | |
|---|---|---|
| EP | 0 274 207 A1 | 7/1988 |
| EP | 0 422 706 A2 | 4/1991 |
| EP | 0 422 706 A3 | 4/1991 |
| EP | 0 654 687 A2 | 5/1995 |
| EP | 1 143 405 A1 | 10/2001 |
| WO | 99/28594 A1 | 6/1999 |
| WO | 02/066921 A2 | 8/2002 |
| WO | 02/066921 A3 | 8/2002 |

OTHER PUBLICATIONS

Bordakov et al, "A new methodology for effectively correcting LWD depth measurements", EAGE 69th Conference and Exhibition, London, UK, Jun. 11-14, 2007, paper D048.

(Continued)

*Primary Examiner* — Robert R Raevis

(57) ABSTRACT

A method and system is disclosed for automatically correcting for depth errors in measurements taken from a drillstring during the drilling phase of the construction of a hydrocarbon wellbore. The correction is based on a stress profile which in turn is based on the states of the drilling rig, drill string description length spec, borehole description trajectory, friction factor and weight on bit.

9 Claims, 3 Drawing Sheets

OTHER PUBLICATIONS

Chia et al, "A new method for improving LWD logging depth", SPE Annual Technical; Conference and Exhibition, San Antonio, Texas, USA, Sep. 24-27, 2006, SPE 102175.

Dashevskiy et al, "Dynamic depth correction to reduce depth uncertainty and improve MWD/LWD log quality", SPE Annual Technical Conference and Exhibition, San Antonio, Texas, USA Sep. 24-27, 2006, SPE 103094.

SYSTEM AND METHOD FOR CORRECTING ERRORS IN DEPTH FOR MEASUREMENTS MADE WHILE DRILLING

CROSS-REFERENCE TO RELATED APPLICATIONS

This application claims the benefits of priority from:
i) Application Number 0322966.3, entitled "SYSTEM AND METHOD FOR CORRECTING ERRORS IN DEPTH FOR MEASUREMENTS MADE WHILE DRILLING," filed in the United Kingdom on Oct. 1, 2003; and
ii) Application Number PCT/GB2004/004123, entitled "SYSTEM AND METHOD FOR CORRECTING ERRORS IN DEPTH FOR MEASUREMENTS MADE WHILE DRILLING," filed under the PCT on Sep. 28, 2004;
All of which are commonly assigned to assignee of the present invention and hereby incorporated by reference in their entirety.

FIELD OF THE INVENTION

The present invention relates to the field of measurements made during the drilling phase of a hydrocarbon borehole. In particular, the invention relates to an automated method for correcting errors in depth for such measurements.

BACKGROUND OF THE INVENTION

During the drilling phase of the construction of a hydrocarbon wellbore, the length of the drillstring in the borehole is used to estimate the measured depth (or along hole length) of a borehole, it is assumed that the pipe is inelastic and therefore does not stretch. However, discrepancies in the length of the borehole estimated at surface during rig operations and the actual length of the borehole there may cause gaps or lost data, when the uncorrected depth is used with logs of data measured during drilling with sensors mounted on the drillstring, such as LWD and MWD logs.

SUMMARY OF THE INVENTION

According to the invention a method is provided for automatically correcting for depth errors in measurements taken from a drillstring comprising the steps of receiving data representing measurements taken in a hydrocarbon wellbore at a plurality of depths within the wellbore from at least one sensor located on a drillstring used to drill the wellbore, automatically calculating corrections for errors in the depth of the locations, and making use of the measured data having the depths corrected.

DETAILED DESCRIPTION OF THE INVENTION

The length of the drillstring in the borehole is used to estimate the measured depth (or along hole length) of a borehole. According to the invention, the depth is corrected. For real drill strings the assumption that the drillstring is inelastic is not valid. The length of the drillpipe is a function of several parameters including temperature, pressure, and stress. According to the invention, corrections are calculated based on at least the stress on the drillstring. In particular, a correction is calculated based on the un-deformed length of the drillstring and the stress due to the buoyant drillstring weight, weight on bit and frictional forces due to contact with the borehole acting along the length of the drillstring. Two of these parameters, friction factor and weight on bit vary depending on the rig operation and the drillers input at surface. According to the invention, a method is provided for correcting the measurement of depth at surface for these parameters. The corrected depth is then used to assign depths to data measured downhole.

Figure 1:
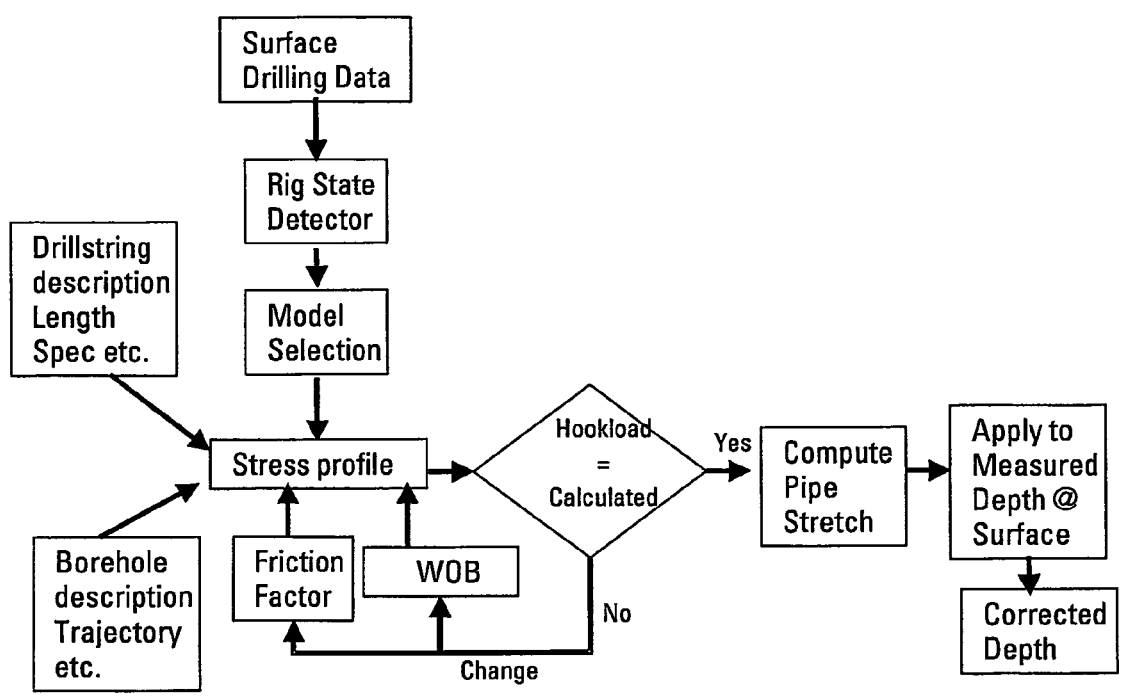
FIG. 1 shows a scheme for correcting depth for measurements made from a drillstring according to a preferred embodiment of the invention.

FIG. 1 shows a scheme for correcting depth for measurements made from a drillstring according to a preferred embodiment of the invention. According to a preferred embodiment of the invention the following steps are undertaken for each time step:

1) The drillstring description, dimensions pipe weight per unit length are input, the pipe length as measured at surface is updated from real-time measurements.
2) the borehole trajectory, inclination and azimuth are input and updated from downhole measurements in real-time.
3) The rig operation is computed preferably as described in U.S. patent application Ser. No. 10/400,125 entitled "System and Method for Rig State Detection," filed on 26 Mar. 2003, and now U.S. Pat. No. 7,128,167 which is a continuation-in-part of co-pending U.S. patent application Ser. No. 10/330,634 filed on 27 Dec. 2002. Both of these applications are hereby incorporated herein by reference.
4) A model for computing the stress in the drillstring is selected.
5) A friction factor is selected for the given rig state.
6) Weight on bit is either estimated from the hookload and total hookload or from weight on bit measured downhole.
7) From these inputs the model is used to compute the hookload. If the hookload is within tolerances equal to the measured hookload the stress profile is accepted and used to compute the pipe stretch. If it is not then the friction factor or the weight on bit are varied until the hookload and the calculated hookloads match. The models used here and in step 4 above are preferably known models such as Drillsafe™.
8) Pipe stretch is then computed using the stress profile.
9) The stretch correction is applied to measured depth to give the corrected depth and time stamped.
10) Time stamped downhole data is the associated with the corrected surface measured depths with the same time stamp.

Figure 2:
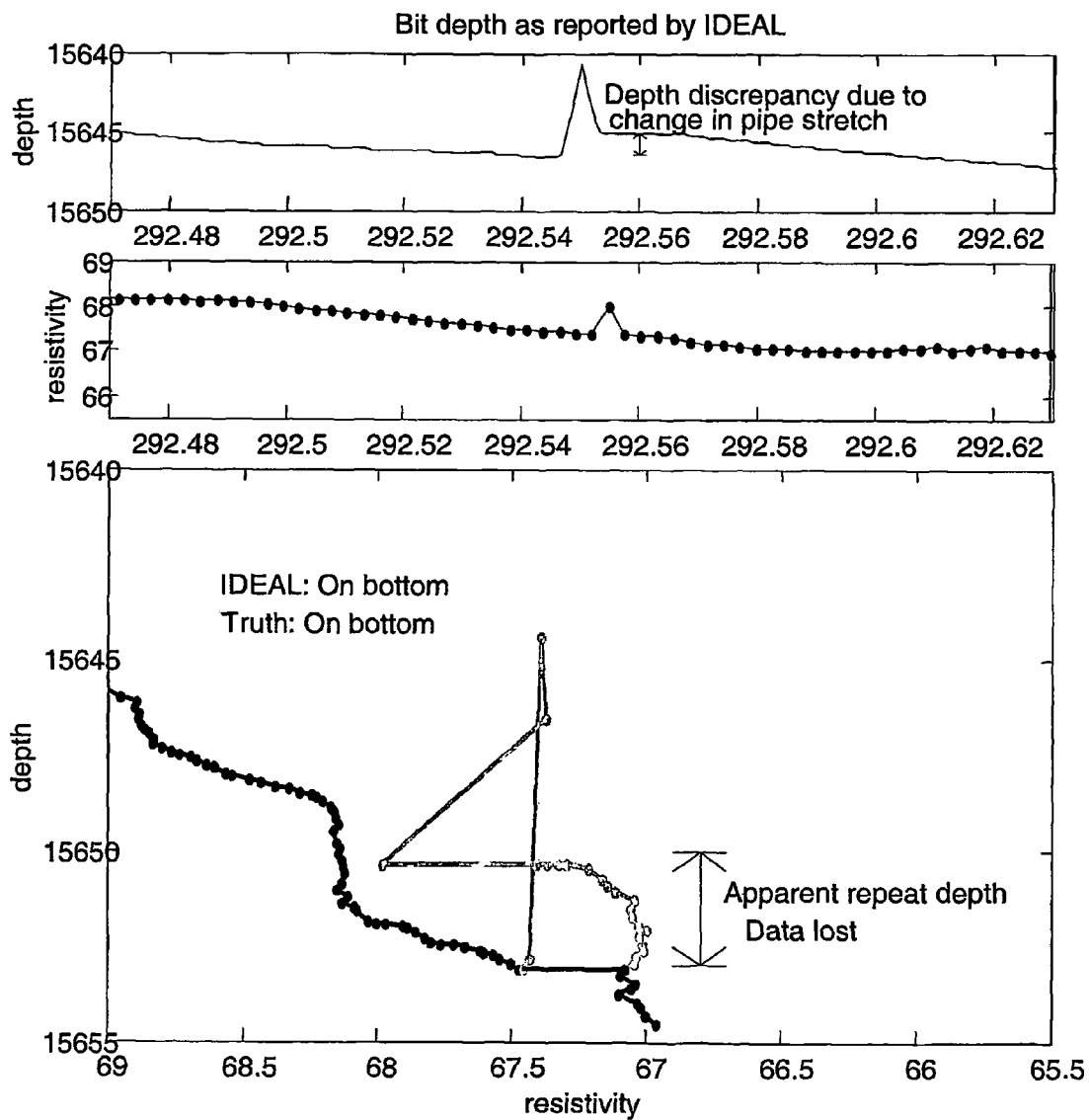
FIG. 2 shows an example of data prior to correction according to a preferred embodiment of the invention.

FIG. 2 shows an example of data prior to correction according to a preferred embodiment of the invention. The first frame of FIG. 2 shows a surface time verse depth plot, the first section is drilling without surface rotation. As a result all of the friction force is opposing the motion of the drillstring along the hole. As a result whilst drilling the direction of the friction force is towards surface. The driller then stops drill pulls the drillstring off bottom and then runs back to bottom rotating the drillstring, when rotating the friction force opposes the direction of rotation and as a result the frictional force along the borehole falls to close to zero. This results in an increase in the tension in the pipe and therefore an increase in the pipe stretch. As a result the position of the bottom of the hole as measured from drillstring length at surface appears shallower than its true position. In the second frame the resistivity data are shown plot against the same time scale. In the third frame the resistivity data are plotted against the apparent depth at which they were measured. It can be seen that there is a section of data in lighter grey that in terms of depths overlaps previously recorded data. Conventionally, these data would be discarded. The darker line represents the data that would be kept. Thus, failure to compensate for errors in depth results not only in lost data but also the thickness of the formation section appearing thinner.

Figure 3:
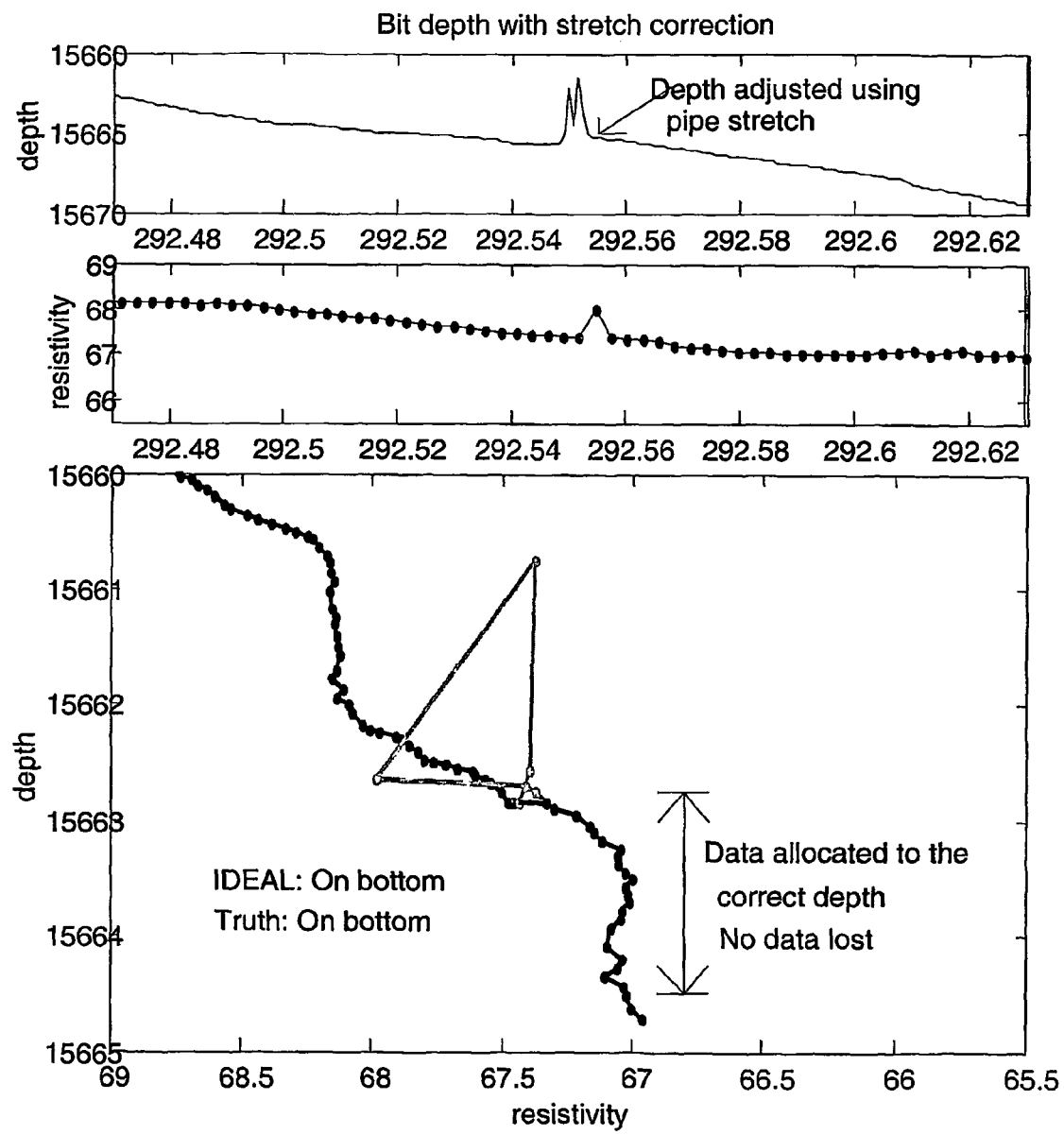
FIG. 3 shows data that has been corrected according to a preferred embodiment of the invention.

FIG. 3 shows corrections according to a preferred embodiment of the invention. The stress profile and the pipe stretch have been calculated according to an appropriate model for the rig operation. Note that in the first frame, the depth at which drilling resumes is very close to the depth at which it stopped. Secondly, the measured resisitivities are properly allocated to the measure depth. Thus, according this embodiment of the invention, there is no loss of data or gaps, (the remaining grey points are recorded off bottom).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method for automatically correcting for depth errors in measurements taken from a drillstring while drilling a hydrocarbon wellbore comprising the steps of:
   determining the depths of locations within the wellbore from the length, under surface conditions, of the drillstring extending to said locations;
   receiving data representing measurements taken in the hydrocarbon wellbore at a plurality of depths within the wellbore from at least one sensor located on the drillstring while the drillstring is used to drill the wellbore;
   automatically calculating corrections for errors in the depths of the locations determined from drillstring length under surface conditions;
   associating the received data with corrected depths at which the data was measured; and
   making use of said data and the corrected depths associated therewith.

2. A method according to claim 1 wherein the step of automatically calculating the corrections is based at least in part on the state of a drilling rig used to support the drillstring at the times when the measurements are taken.

3. A method according to claim 1 comprising a step of measuring the length of portions of the drillstring prior to insertion into the wellbore.

4. A method according to claim 3 wherein a time versus depth log is constructed using at least the measured length of portions of the drillstring.

5. A method according to claim 4 wherein the calculated corrections are applied to the time versus depth log to generate a corrected time versus depth log, and wherein the corrected time versus depth log is combined with the data representing measurements taken in the wellbore such that a corrected depth can be attributed to said measurements.

6. A method according to claim 1 wherein said step of calculating corrections is based in part on estimates of stretch of the length of the drillstring.

7. A method according to claim 1 wherein said step of calculating corrections includes the step of computing the hookload.

8. A method according to claim 7 wherein said step of calculating corrections includes the step of computing a calculated hookload and varying the friction factor or the weight on bit until the hookload and the calculated hookload match.

9. A method for automatically correcting for depth errors in measurements taken from a drillstring while drilling a hydrocarbon wellbore comprising the steps of:
   determining the depths of locations within the wellbore from the length, under surface conditions, of the drillstring extending to said locations;
   receiving data representing measurements taken in the hydrocarbon wellbore at a plurality of depths within the wellbore from at least one sensor located on the drillstring while the drillstring is used to drill the wellbore;
   supplying computing means with inputs of drillstring dimensions and weight under surface conditions, borehole trajectory, inclination and azimuth, a friction factor chosen dependent on state of rig operation, and a value of weight on bit;
   using said inputs to compute a value of hookload;
   comparing the computed value of hookload with a measured value;
   adjusting at least one of the chosen friction factor and the weight on bit to approximate the calculated value of hookload to the measured value;
   using said inputs as adjusted to compute stretch in the drillstring and hence compute corrections for errors in the depths of the locations determined from drillstring length under surface conditions;
   associating the received data with corrected depths at which the data was measured; and
   making use of said data with the corrected depths associated therewith.

* * * * *